(12) United States Patent
Bolten

(10) Patent No.: US 6,860,502 B1
(45) Date of Patent: Mar. 1, 2005

(54) TRAILER HITCH GUIDE

(76) Inventor: John R. Bolten, 3700 County Rd. 530B, Burleson, TX (US) 76028

( * ) Notice: Subject to any disclaimer, the term of this patent is extended or adjusted under 35 U.S.C. 154(b) by 0 days.

(21) Appl. No.: 10/702,885

(22) Filed: Nov. 6, 2003

(51) Int. Cl.$^7$ .............................. B60D 1/36; G02B 7/18
(52) U.S. Cl. ........................ 280/477; 359/841; 359/844
(58) Field of Search ........................ 280/477; 116/28 R; 33/264; 359/841, 844, 873, 881

(56) References Cited

U.S. PATENT DOCUMENTS

| 931,291 A | 8/1909 | Germain | | |
|---|---|---|---|---|
| 1,782,175 A | 11/1930 | Pearmain | | |
| 1,877,997 A | 9/1932 | Shapiro et al. | | |
| 1,905,323 A | 4/1933 | Wallace | | |
| 2,623,435 A | 12/1952 | Geis | | |
| 3,524,701 A | 8/1970 | Strohmeier | | |
| 3,767,292 A | 10/1973 | Rutkowski | | |
| 3,858,966 A | 1/1975 | Lowell, Jr. | | |
| 4,602,855 A | 7/1986 | Frey | | |
| 4,905,376 A | 3/1990 | Neeley | | |
| 5,235,468 A | * | 8/1993 | Stephens | 359/841 |
| 5,625,500 A | * | 4/1997 | Ackerman | 359/841 |
| 5,657,175 A | * | 8/1997 | Brewington | 359/872 |
| 5,784,213 A | * | 7/1998 | Howard | 359/872 |
| 5,971,555 A | * | 10/1999 | Wilcox et al. | 359/872 |
| 5,979,927 A | * | 11/1999 | Hale | 280/477 |
| 6,102,423 A | * | 8/2000 | Beck et al. | 280/477 |
| 6,239,926 B1 | | 5/2001 | DeShazer | |
| 6,619,685 B2 | * | 9/2003 | Teague | 280/477 |

* cited by examiner

Primary Examiner—Kevin Hurley
(74) Attorney, Agent, or Firm—Bracewell & Patterson L.L.P.

(57) ABSTRACT

A guide is provided for aligning a trailer hitch on a draft vehicle with a receiving socket on a towing load such as a trailer, for assisting a driver of the draft vehicle in connecting the trailer hitch to the receiving socket for towing. The guide comprises a support structure mountable to the draft vehicle, containing a reflective surface on a moveable structure supported at an inclination relative to the trailer hitch. The guide captures an image of the trailer hitch on the draft vehicle so that the driver may view the image of the trailer hitch from the driver's seat of the draft vehicle.

10 Claims, 2 Drawing Sheets

TRAILER HITCH GUIDE

FIELD OF THE INVENTION

The present invention relates generally to vehicle guiding devices, and in particular to devices that assist in the alignment of towing interconnections between draft vehicles and towing loads such as trailers. Still more particularly, the present invention relates to devices that assist in the vertical alignment of a trailer hitch on a draft vehicle with a corresponding receiving socket on a trailer tongue.

BACKGROUND OF THE INVENTION

The alignment of interconnection points on a towing load and a draft vehicle is usually a difficult process. Very commonly the driver's seat of the draft vehicle is remote from the site of the interconnection point. Examples include the driver's seat in a pick-up truck having a trailer hitch mounted on the rear bumper, and the driver's seat of an aircraft docking vehicle, which seat is generally at the rear of such vehicle while the towing interconnection point is on a tongue extending forward from the front. Even in the docking vehicle example, where the hitch interconnection point may be visible to the driver, a vertical view for precise alignment is not available. Commonly, then, the driver of the draft vehicle must either guess at the proximity of the receiving socket, dismount the draft vehicle for closer inspection and then remount the draft vehicle to adjust its position, or have a second person stand at a strategic location and provide signals. Often, such a second person is not available, and the alternative of guessing and adjusting the position of the draft vehicle is a repetitive and inexact process. Frequently, the process results in the driver of the draft vehicle attempting to manually maneuver the tongue of the towing load to complete the interconnection. Just as commonly, however, such maneuvering is not possible for a single man due to the weight of the towing load.

A number of devices have been provided for assisting the driver in an alignment such as this. In some of the prior art, an attempt to increase the field of vision resulted in the use of a curved reflective surface. See, e.g., Neeley (U.S. Pat. No. 4,905,376), Rutkowski (U.S. Pat. No. 3,762,292) and Strokmeier (U.S. Pat. No. 3,524,701). Such a curved reflective surface merely aggravates the image size problem. Thus, the driver cannot see an image of the trailer hitch ball that approximates the size of the image of the receiving socket until the two are relatively close to each other, and neither image remains fixed in apparent size throughout the operation.

Other efforts to solve the alignment problem include Lowell (U.S. Pat. No. 3,858,966) which employs an indicator element (similar to a weather vane) that points in the direction of adjustment as the draft vehicle approaches the trailer load. This device, however, relies upon a tether to the draft vehicle, requiring at least one entry and exit of the draft vehicle by the driver to hook up the tether once the draft vehicle has been maneuvered to within its range.

SUMMARY

The present invention is a trailer hitch guide for aligning a trailer hitch of a draft vehicle with a towing load. A moveable structure is hingeably connected to a support structure at the top of each frame. Thus, the moveable structure is angularly moveable relative to the support structure from a storage position to an operational position at an angular displacement. A reflective surface is affixed to the moveable structure. A brace is connected to both the moveable structure and the support structure, which locks the moveable structure in the operational position. A mounting structure is attached to the support structure to mount onto the draft vehicle with the reflective surface facing the trailer hitch.

Accordingly, an object of this invention is to provide a means by which a single driver operating a draft vehicle can precisely align a trailer hitch with a receiving socket on a towing load without the assistance of a second person.

Another object of this invention is to provide the driver of the draft vehicle a view of the trailer hitch from the vertical.

Another object of this invention is to provide an alignment device that mounts to the draft vehicle rather than to the towing load, thereby avoiding the requirement of multiple mounting operations for instances where multiple towing jobs are needed.

Another object of the present invention is to provide a flat reflective surface that can be mounted onto the draft vehicle, at a fixed distance from the eye of the driver of the draft vehicle, thereby permitting the driver of the draft vehicle constantly to keep within his view an image of the trailer hitch of constant size. The driver will thereby be enabled to witness an image of the receiving socket of a size comparable to that of the trailer hitch come into view in the reflecting surface as he maneuvers the draft vehicle to approach the towing load.

DETAILED DESCRIPTION OF THE INVENTION

Figure 1:
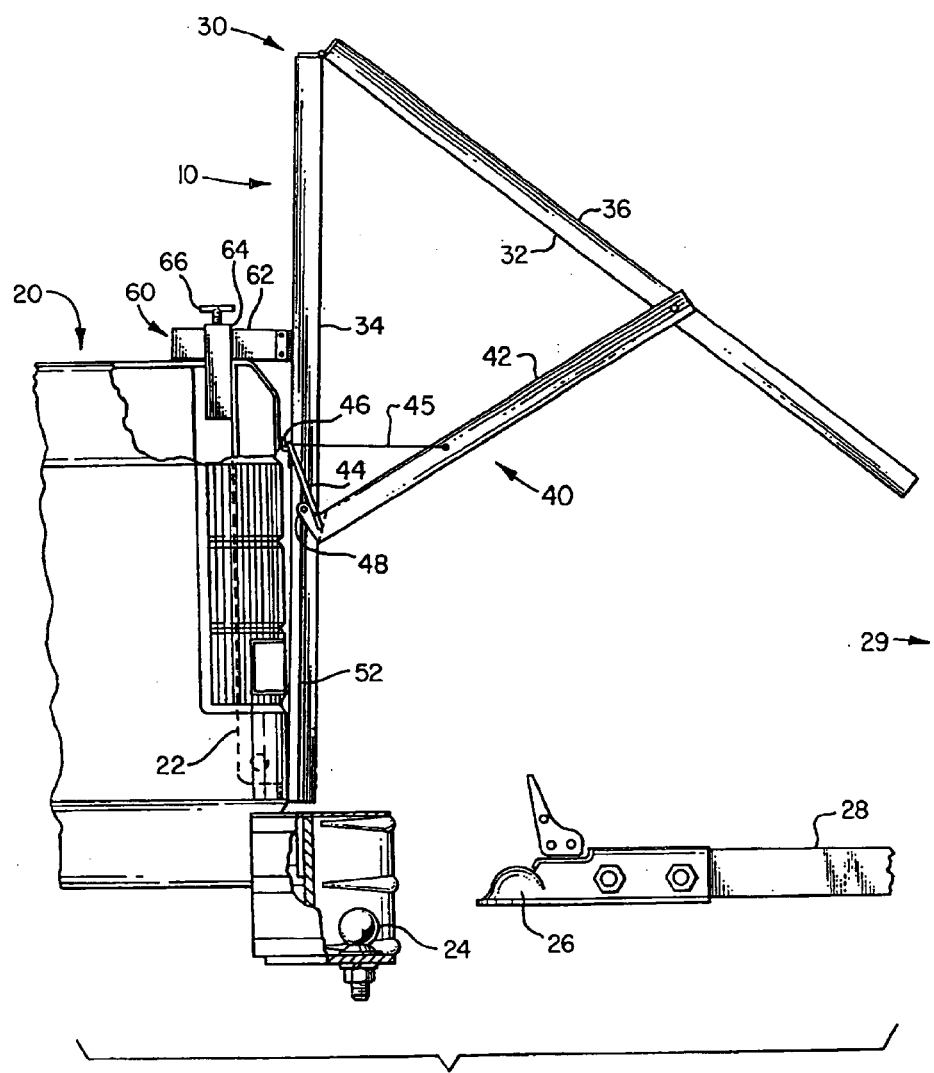
FIG. 1 shows a side view of one embodiment of the present invention mounted to the rear of a pick-up truck and having a trailer hitch on the rear bumper.

Referring now more particularly to the drawings wherein the reference numerals designate the same or identical parts throughout several views, FIG. 1 shows a guide 10 vertically mounted to a draft vehicle 20 by mounting structure 60. The guide 10 comprises a support structure 34 shown in a substantially vertical orientation and a movable structure 36 diagonally positioned and hingably attached at the top portion of the support structure 34. The reflective surface 32 is contained in the movable structure 36 shown braced against the support structure 34 that rests against the tailgate 22 of the draft vehicle 20. The movable structure 36 is held in position by a brace 40 pivotally attached at a point along the side of the movable structure 36 and slideably cooperating at its opposite end with a channel 52 in the side of the support structure 34 by means of a flange 48 having a pin 50 that extends into and cooperates with the channel 52. Further, this slideable interconnection of the brace 40 with the support structure 34 is held in a locked position by a securing means comprising a latch 44 attached to the brace 40 that cooperates with a latch receiver 46 provided on the support structure 34.

In FIG. 1, the guide 10 is positioned on the draft vehicle 20 at its tailgate 22, shown in phantom in the drawing (dashed lines). The mounting structure 60 holds the support structure 34 against the draft vehicle 20 by means of hooks 60 comprising a mounting arm 62 and a retainer arm 64, which extend forward of the front side (as defined by the front and rear of the draft vehicle 20) of the guide 10 to a point where the retainer arm 64 drops below the top of and forward the tailgate 22. The retainer arm 64 is slideably adjustable along the length of the mounting arm 62, and the retainer arm 64 is held in a fixed position relative to the mounting arm 62 by a fastener 66. In this mounting position, the image of the trailer hitch 24 and the receiving socket 26 attached to the trailer tongue 28 is reflected horizontally forward the tailgate to within the view of the driver seated in the driver's seat of the draft vehicle 20.

Figures 2, 3:
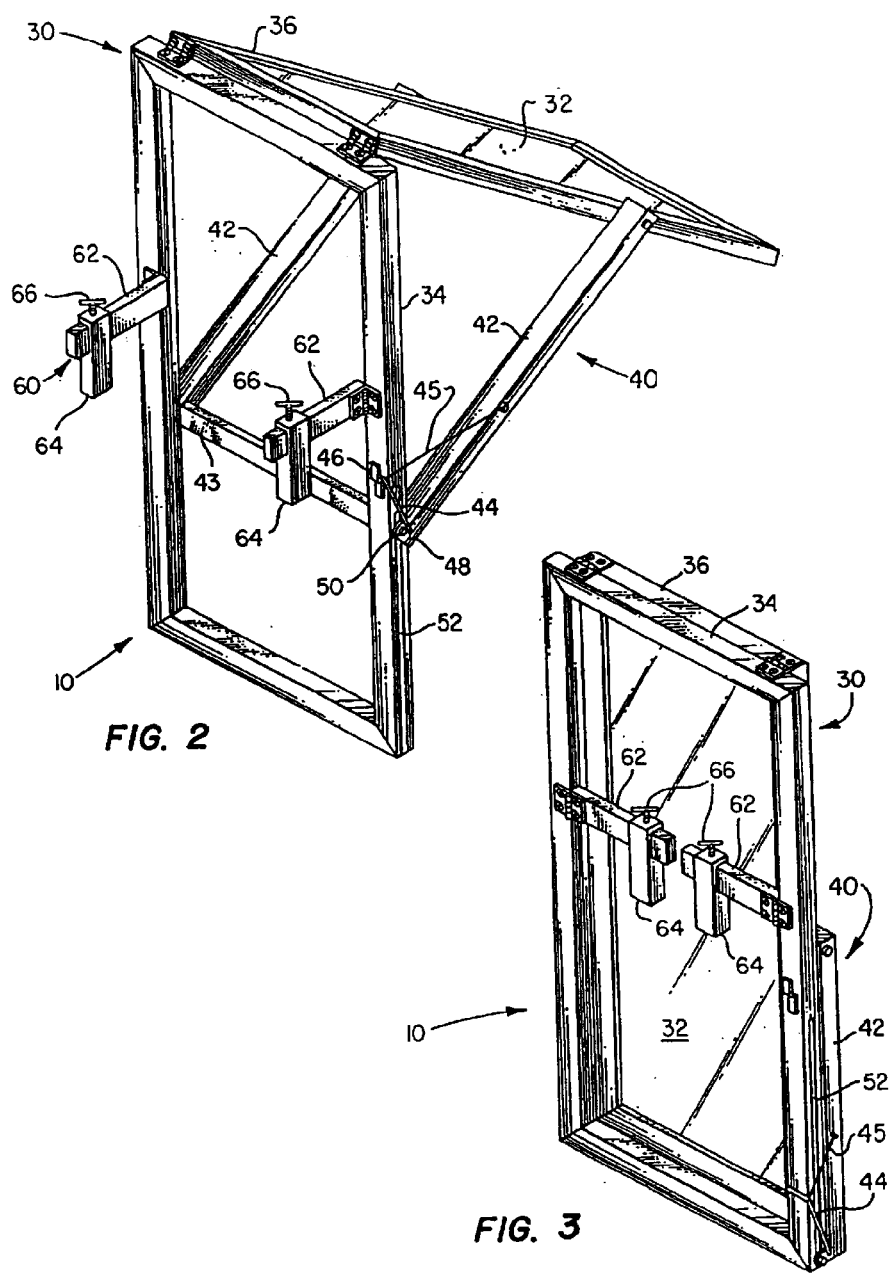
FIG. 2 shows a perspective view of the same embodiment of the present invention. It depicts the fixed frame as a rectangle with two attachment arms extended perpendicular thereto.
FIG. 3 shows a perspective view of the same embodiment of the present invention folder for storage.

FIG. 2 shows a brace 40, comprising two rigid members 42 and a crosspiece 43 that interconnect the two rigid members 42, each rigid member having a flange 48 and a pin 50 which extend into and cooperate with the channel 52 on the side of the support structure 34. The reflective surface 32 is shown contained in the moveable structure 36.

Reference to FIG. 3 reveals that this embodiment of the present invention can be folded into a storage position by reducing the angular displacement of the moveable structure 36 from the support structure 34 to an angular displacement of zero degrees, thereby bringing the moveable structure 36 into a parallel juxtaposed relationship to the support structure 34. In this position, the brace 40 also is parallel and juxtaposed to the support structure 34 and likewise parallel and juxtaposed to the moveable structure 36. The latch 44 is held in storage position by a latch tether 45 comprising an elastic material that pulls the latch against the face of the support structure 34 regardless of the angular displacement of the moveable structure 36 relative to the support structure 34. It can also be seen that the mounting structure 60, comprising the mounting arm 62 and slideable retainer arm 64 with fastener 66, can be folded for storage into the interior of the plane form by the support structure 34.

In operation, the guide 10 would be removed from storage, mounted on the tailgate 22 of the draft vehicle 20 by use of the mounting structure 60 and unfolded by lifting the bottom edge of the movable structure 36 opposite its hinged attachment point to the support structure 34 to increase the angular displacement of the moveable structure 36 relative to the support structure 34. At a predetermined angular displacement, the latch 44 would ride up over the latch receiver 46 and be caused to snap into place by the elastic latch tether 45, thus fixing the position of the moveable structure 36 at a predetermined angular displacement. At such predetermined angular displacement, the driver of the draft vehicle 20 could view from the driver's seat of the draft vehicle 20 an image of the trailer hitch 24 in the reflective surface 32. This enables the driver to maneuver the draft vehicle 20 into position to permit precise alignment of the trailer hitch 24 and the receiving socket 26 without the driver having to repeatedly exit and reenter the draft vehicle 20 for alignment inspection. Once the towing operation is complete, the guide 10 would be removed from the tailgate 22 of the draft vehicle 20, collapsed to its storage position as shown in FIG. 3, and stored for later use.

The guide 10 effectively gives the driver a view of the trailer hitch 24 from the vertical, simultaneously showing both longitudinal and transverse alignment. The images of the trailer hitch 24 and receiving socket 26 visible in the reflecting surface 32 remain constant in size as and when seen by the driver of the draft vehicle 20 over the entire time of the maneuvering operation, and the image of the trailer hitch 24 is visible at all such times. The guide 10 may be mounted once on the draft vehicle 20 for a multiplicity of towing operations involving multiple towing loads 29 without requiring remounting the guide for each such operation. This would be an advantage in, for example, a trailer yard such as that utilized in a trailer rental or a mobile home business. Finally, the guide 10 may be removed from the draft vehicle 20 when not in use and stored in the fashion shown in FIG. 3 which minimizes its effective volume.

The invention has been shown in only one of its forms. It should be apparent to those skilled in the art that it is not so limited, but is susceptible to various changes and modifications without departing from the spirit thereof. For example, in another embodiment of the invention, the mounting structure 60 for mounting the support structure 34 to the tailgate 22 of the draft vehicle 20 comprises a plurality of suction cups attached to the front face of the support structure 34 and cooperating with the tailgate 22, rather than mounting arms 62 and retainer arms 64 as shown in the embodiment depicted by the drawings. Also, the securing means for the brace 40 could be enhanced to provide adjustments to the predetermined angular displacement by including a plurality of latch receivers 46 positioned along the support structure 34 or by replacing the fixed latch receiver 46 with a slideable, vertically adjustable latch receiver.

Obviously, many other modifications and variations of this invention are possible in light of the foregoing teachings, including variations in the type of draft vehicle 20. It is therefore understood that within the scope of the appended claims, the invention may be practiced otherwise than as specifically described.

What is claimed is:

1. A guide apparatus for aligning a trailer hitch of a draft vehicle with a towing load, the guide apparatus comprising:

a support structure;

a moveable structure hingeably connected to the support structure, wherein the moveable structure is angularly moveable relative to the support structure from a storage position to an operational position at an angular displacement;

at least one reflective surface affixed to the movable structure;

at least one brace connected to both the moveable structure and the support structure that locks the moveable structure in the operational position;

a mounting structure attached to the support structure to mount onto the draft vehicle with the reflective surface facing the trailer hitch;

wherein the brace is pivotally connected to the movable structure and slideably connected to the support structure;

wherein the support structure defines at least one slideable receiver, and wherein one end of the brace comprises a slideable device; and wherein the slideable receiver defines a channel, and wherein the slidable device comprises a pin.

2. A guide apparatus for aligning a trailer hitch of a draft vehicle with a towing load, the guide apparatus comprising:

a support structure;

a movable structure hingeably connected to the support structure, wherein the movable structure is angularly movable relative to the support structure from a storage position to an operational position at an angular displacement;

at least one reflective surface affixed to the moveable structure;

at least one brace connected to both the moveable structure and the support structure that locks the moveable structure in the operational position;

a mounting structure attached to the support structure to mount onto the draft vehicle with the reflective surface facing the trailer hitch; and further comprising a latch receiver on the support structure, and a latch on the brace, wherein the latch is latchable onto the latch receiver.

3. A guide apparatus for aligning a trailer hitch of a draft vehicle with a towing load, the guide apparatus comprising:

a support structure;

a moveable structure hingeably connected to the support structure, wherein the movable structure is angularly moveable relative to the support structure from a storage position to an operational position at an angular displacement;

at least one reflective surface affixed to the moveable structure;

at least one brace connected to both the moveable structure and the support structure that locks the moveable structure in the operational position;

a mounting structure attached to the support structure to mount onto the draft vehicle with the reflective surface in the trailer hitch;

wherein the mounting structure comprises at least one hook; and wherein the hook is attached to the support structure by a hinge.

4. The guide of claim 3, wherein the hook folds about the hinge to a position in the same plane with the support structure.

5. A guide apparatus for aligning a trailer hitch of a draft vehicle with a towing load, the guide apparatus comprising:

a support structure;

a moveable structure hingeably connected to the support structure, wherein the movable structure is angularly moveable relative to the support structure from a storage position to an operational position at an angular displacement;

at least one reflective surface affixed to the moveable structure;

at least one brace connected to both the moveable structure and the support structure that locks the moveable structure in the operational position;

a mounting structure attached to the support structure to mount onto the draft vehicle with the reflective surface facing the trailer hitch;

wherein the mounting structure comprises at least one hook; and wherein the hook comprises both a mounting arm protruding from the support structure, and a retainer arm slideably mounted to the mounting arm that moves both toward the support structure and outward from the support structure.

6. A guide apparatus for aligning a trailer hitch of a draft vehicle with a towing load, the draft vehicle operable by a driver and having a driver's seat remote from the trailer hitch, the guide apparatus comprising:

a fixed frame attachable to the draft vehicle, wherein the fixed frame is hingeably connected to a moveable frame to angularly adjust the moveable frame relative to the fixed frame;

at least one brace connecting the fixed frame to the movable frame at an angular displacement, wherein a first end of the brace is pivotally connected to one of the frames, and wherein a second end of the brace is latchably connected to the other of the frames to lock in place the moveable frame relative to the fixed frame;

a mounting structure that releasably mounts the fixed frame to the draft vehicle;

at least one reflective surface affixed to the movable frame at an inclination relative to the trailer hitch that captures an image of the trailer hitch in the reflective surface, whereby the driver may view the image of the trailer hitch from the driver's seat; and further comprising a latch on the second end of the brace that connects with a latch receiver on the other of the frames to lock in place the moveable frame relative to the fixed frame at an angular displacement.

7. A guide apparatus for aligning a trailer hitch of a draft vehicle with a towing load, the draft vehicle operable by a driver and having a driver's seat remote from the trailer hitch, the guide apparatus comprising:

a fixed frame attachable to the draft vehicle, wherein the fixed frame is hingeably connected to a moveable frame to angularly adjust the moveable frame relative to the fixed frame;

at least one brace connecting the fixed frame to the movable frame at an angular displacement, wherein a first end of the brace is pivotally connected to one of the frames, and wherein a second end of the brace is latchably connected to the other of the frames to lock in place the moveable frame relative to the fixed frame;

a mounting structure that releasably mounts the fixed frame to the draft vehicle;

at least one reflective surface affixed to the movable frame at an inclination relative to the trailer hitch that captures an image of the trailer hitch in the reflective surface, whereby the driver may view the image of the trailer hitch from the driver's seat;

wherein the mounting structure comprises at least one hook; and wherein the hook is hingeably attached to the fixed frame, and wherein the hook is hingeable from the storage position folded against the fixed frame to an operational position extended outward from the fixed frame.

8. A guide apparatus for aligning a trailer hitch of a draft vehicle with a towing load, the draft vehicle operable by a driver and having a driver's seat remote from the trailer hitch, the guide apparatus comprising:

a fixed frame attachable to the draft vehicle, wherein the fixed frame is hingeably connected to a moveable frame to angularly adjust the moveable frame relative to the fixed frame;

at least one brace connecting the fixed frame to the movable frame at an angular displacement, wherein a first end of the brace is pivotally connected to one of the frames, and wherein a second end of the brace is latchably connected to the other of the frames to lock in place the moveable frame relative to the fixed frame;

a mounting structure that releasably mounts the fixed frame to the draft vehicle;

at least one reflective surface affixed to the movable frame at an inclination relative to the trailer hitch that captures an image of the trailer hitch in the reflective surface, whereby the driver may view the image of the trailer hitch from the driver's seat;

wherein the mounting structure comprises at least one hook; and wherein the hook comprises both a mounting arm protruding from the support structure, and a retainer arm slideably mounted to the mounting arm that moves both toward the support structure and outward from the support structure.

9. A method for aligning a trailer hitch of a draft vehicle with a towing load, the draft vehicle operable by a driver and having a driver's seat remote from the trailer hitch, the method comprising:

moving a moveable frame relative to a stationary frame at an angular displacement from a storage position to an operational position, wherein the moveable frame is hingeably attached to the stationary frame, and wherein the moveable frame comprises a reflective surface;

positioning a brace in the operational position, wherein a first end of the brace is pivotally connected to one of the frames, and wherein a second end of the brace comprises a latch to connect the brace with the other of the frames;

latching the latch to a latch receiver on the other of the frames, thereby locking the movable frame in the operational position;

mounting a mounting structure attached to the stationary frame onto the draft vehicle with the reflective surface facing the trailer hitch;

capturing an image of the trailer hitch in the reflective surface, whereby the driver may view the image of the trailer hitch from the driver's seat; and wherein mounting a mounting structure comprises adjusting a slideable retainer arm along a mounting arm, to define a slot of selected width between the retainer arm and the stationary frame; and placing the slot over an upper edge of the tailgate of the draft vehicle to secure the mounting structure onto the draft vehicle.

10. A method for aligning a trailer hitch of a draft vehicle with a towing load, the draft vehicle operable by a driver and having a driver's seat remote from the trailer hitch, the method comprising:

moving a moveable frame relative to a stationary frame at an angular displacement from a storage position to an operational position, wherein the moveable frame is hingeably attached to the stationary frame, and wherein the moveable frame comprises a reflective surface;

positioning a brace in the operational position, wherein a first end of the brace is pivotally connected to one of the frames, and wherein a second end of the brace comprises a latch to connect the brace with the other of the frames;

latching the latch to a latch receiver on the other of the frames, thereby locking the movable frame in the operational position;

mounting a mounting structure attached to the stationary frame onto the draft vehicle with the reflective surface facing the trailer hitch;

capturing an image of the trailer hitch in the reflective surface, whereby the driver may view the image of the trailer hitch from the driver's seat; and further comprising folding the mounting structure to a storage position, wherein the mounting structure is in the same plane as the stationary frame.

* * * * *